US012759487B2

(12) United States Patent
Tu

(10) Patent No.: US 12,759,487 B2
(45) Date of Patent: Oct. 13, 2026

(54) DETECTING AUTOMOTIVE COMMUNICATION CABLE DEGRADATION WITHOUT INTERRUPTING NORMAL OPERATIONS

(71) Applicant: Avago Technologies International Sales Pte. Limited, Singapore (SG)

(72) Inventor: Chung Ming Tu, Irvine, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 19/169,967

(22) Filed: Apr. 3, 2025

(65) Prior Publication Data

US 2026/0307608 A1 Oct. 8, 2026

(51) Int. Cl.
*B60R 16/023* (2006.01)
*G07C 5/00* (2006.01)

(52) U.S. Cl.
CPC .......... *B60R 16/0234* (2013.01); *G07C 5/006* (2013.01)

(58) Field of Classification Search
CPC ............................ B60R 16/0234; G07C 5/006
USPC ..................................................... 701/1, 34.4
See application file for complete search history.

(56) References Cited

U.S. PATENT DOCUMENTS 8,532,488 B2 * 9/2013 Nielsen ..................... H04J 3/00 398/67
10,091,053 B2 * 10/2018 Chini ...................... H04L 43/10
12,154,387 B2 * 11/2024 Farjadrad ............. G05B 19/042
12,237,982 B2 * 2/2025 Razavi Majomard .. H04L 67/12
2012/0109406 A1 * 5/2012 Yousefi ................. H04W 72/56 701/1
2012/0109407 A1 * 5/2012 Yousefi ................. H04L 47/821 701/1
2013/0004179 A1 * 1/2013 Nielsen .............. H04N 21/6175 398/115
2013/0265895 A1 * 10/2013 Diab ................... H04L 41/0816 370/468

(Continued)

FOREIGN PATENT DOCUMENTS

EP 4095533 A2 11/2022

OTHER PUBLICATIONS

Extended European Search Report mailed May 13, 2026 in European Patent Application No. 26170543.8, 9 pages.

*Primary Examiner* — Jaime Figueroa
(74) *Attorney, Agent, or Firm* — Kim & Stewart LLP

(57) ABSTRACT

A computer system of a vehicle comprising a physical layer (PHY) device, is configured to perform the following steps to detect degradation in a cable: communicating with another component of the vehicle using the PHY device and the cable at a first timing; capturing first characteristics of at least one first signal communicated with the other component, and determining a first degradation parameter using the first characteristics; communicating with the other component of the vehicle using the PHY device and the cable at a second timing that is after the first timing; capturing second characteristics of at least one second signal communicated with the other component, and determining a second degradation parameter using the second characteristics; and comparing the first degradation parameter with the second degradation parameter, and generating a degradation warning if a difference between the first and second degradation parameters indicates degradation in the cable.

20 Claims, 4 Drawing Sheets

(56) References Cited

U.S. PATENT DOCUMENTS

| | | | | |
|---|---|---|---|---|
| 2017/0134215 | A1* | 5/2017 | Chini | H04L 41/0631 |
| 2019/0165921 | A1* | 5/2019 | Wu | H04L 1/0015 |
| 2021/0058168 | A1* | 2/2021 | Zang | G01R 31/088 |
| 2022/0044495 | A1* | 2/2022 | Farjadrad | G06F 11/3055 |
| 2022/0385544 | A1* | 12/2022 | Razavi Majomard | H04L 41/149 |
| 2023/0041290 | A1* | 2/2023 | Cooper | G06N 3/0455 |

* cited by examiner

DETECTING AUTOMOTIVE COMMUNICATION CABLE DEGRADATION WITHOUT INTERRUPTING NORMAL OPERATIONS

BACKGROUND

Vehicles often include automotive communication cables, which are used for transmitting data between different electronic systems, sensors, control units, and other components of the vehicles. Over time, such cables often degrade, sometimes to the point at which communication between components is impaired or completely disrupted. For example, one or two wires in a cable may become open, one or two wires may become shorted, sections of a cable may become untwisted, connectors in the cable may become loose, the cable may become pinched or bent, or the cable may be damaged in other ways such as by exposure to moisture or by normal wear and tear. Detecting that a cable is degrading may be crucial because the integrity of the cable may directly affect the performance and safety of an electronic system in the vehicle. Furthermore, detecting such degrading is often difficult, requiring disrupting data communication over the cable and thus disrupting the normal operation of the vehicle. There is thus a desire to detect degradation before communications fail and in a manner that avoids such disruption, so that timely notice of degradation may be provided seamlessly, and maintenance may be performed on damaged cables or such cables may be replaced, to avoid vehicle operator safety concerns.

SUMMARY

One or more embodiments provide a computer system of a vehicle, including a processor and a physical layer (PHY) device that is configured to communicate with other components of the vehicle via at least a first cable. The computer system is configured to detect degradation in the first cable by performing the following steps: communicating with another component of the vehicle using the PHY device and the first cable at a first timing; capturing first characteristics of at least one first signal communicated with the other component at the first timing, and determining a first degradation parameter using the first characteristics; communicating with the other component of the vehicle using the PHY device and the first cable at a second timing that is after the first timing; capturing second characteristics of at least one second signal communicated with the other component at the second timing, and determining a second degradation parameter using the second characteristics; and comparing the first degradation parameter with the second degradation parameter, and generating a degradation warning if a difference between the first and second degradation parameters indicates degradation in the first cable.

Further embodiments include a method comprising the above steps and a non-transitory computer-readable storage medium comprising instructions that cause a computer system to carry out steps of: identifying the first characteristics of the at least one first signal, and determining the first degradation parameter using the first characteristics; identifying the second characteristics of the at least one second signal, and determining the second degradation parameter using the second characteristics; and comparing the first degradation parameter with the second degradation parameter, and generating the degradation warning if the difference between the first and second degradation parameters indicates the degradation in the first cable.

DETAILED DESCRIPTION

Techniques are described for detecting degradation of automotive communication cables. According to techniques, a PHY device of a vehicle communicates with other components of a vehicle. As used herein, a PHY device is hardware configured to transmit and receive data over a medium such as an automotive communication cable. The other components of the vehicle are sometimes referred to herein as “link partners,” which are PHY devices on the other end of such communications.

As the PHY device communicates with a link partner, the PHY device captures characteristics such as internal signals of the PHY device. Those characteristics are used to determine diagnostic information that is useful for identifying whether a cable is degrading, even if such degradation has not yet begun impairing communications. Such diagnostic information is referred to herein as “degradation parameters.” Various types of degradation parameters are described herein for detecting degradation, and various characteristics are described herein for determining such degradation parameters.

Degradation parameters are determined at different timings. For example, the degradation parameters may be determined shortly after a vehicle is manufactured, which may create a baseline of the degradation parameters. The degradation parameters may then be determined again periodically, e.g., every time the vehicle starts operation, for comparison with the baseline. If a difference between the degradation parameters indicates degradation in a cable, a warning may be generated indicating that the cable is degrading.

In some cases, for example, the PHY device may communicate with link partners via duplex cables, which are cables that support two-direction communications. In other cases, for example, the PHY device may communicate with link partners via simplex cables, which are cables that only support one-direction communications. Accordingly, a cable being analyzed for degradation may be a duplex cable over which the PHY device transmits and receives signals to a link partner. The cable being analyzed may also be a simplex cable over which the PHY device only transmits signals to a link partner or a simplex cable over which the PHY device only receives signals from a link partner.

Techniques allow for detecting signs of degradation as they occur or become worse over time-even before such degradation impairs or completely disrupts further communications. Furthermore, such techniques do not disrupt normal communications over the cable. In other words, while a vehicle is being operated and the PHY device is communicating with its link partners to support typical operations of the vehicle, internal signals may be captured and degradation parameters may be determined and compared in the background. These and further aspects of the invention are discussed below with respect to the drawings.

Figure 1:
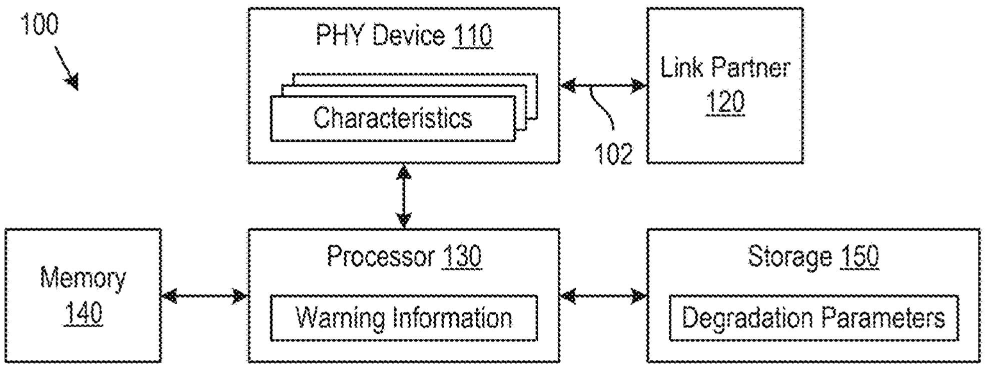
FIG. 1 is a block diagram of a computer system of a vehicle in which first and second embodiments may be implemented.

FIG. 1 is a block diagram of a computer system 100 of a vehicle in which first and second embodiments may be implemented. Computer system 100 includes a PHY device 110 configured to communicate with a link partner 120 via an automotive communication cable 102. According to the first and second embodiments, cable 102 is a duplex cable. Accordingly, PHY device 110 transmits signals to link partner 120 via cable 102 and also receives signals from link partner 120 via cable 102. Differences between the first and second embodiments will be discussed below in conjunction with FIGS. 2 and 3.

Computer system 100 further includes a processor 130, memory 140, and storage 150. Memory 140 is a volatile data storage device such as random-access memory (RAM). Storage 150 is a non-volatile data storage device such as flash memory. Processor 130 is a processing device such as a central processing unit (CPU) configured to execute instructions such as executable instructions that perform one or more operations described herein, which may be stored in memory 140. For example, processor 130, memory 140, and storage 150 may be components of an electronic control unit (ECU) of the vehicle. An ECU is a specialized computer that manages and controls functions within a vehicle. In such case, for example, PHY device 110 may communicate with processor 130 via a wired connection. As another example, processor 130, memory 140, and storage 150 may be components of a computer that is separate from the vehicle, such as a desktop computer, laptop, tablet computer, smartphone, etc. In such case, for example, PHY device 110 may communicate with processor 130 wirelessly.

At various timings, as PHY device 110 communicates with link partner 120, PHY device 110 captures characteristics therein. Such characteristics are based on signals transmitted to link partner 120 and signals received from link partner 120. Computer system 100 uses such characteristics to determine degradation parameters associated with different timings. Processor 130 may persist such degradation parameters in storage 150, including, e.g., degradation parameters associated with a baseline. For example, the degradation parameters associated with the baseline may be determined based on communications made shortly after manufacturing of the vehicle. According to embodiments, processor 130 compares degradation parameters determined at different timings. Based on such comparison, degradation may be identified in cable 102.

Figure 2:
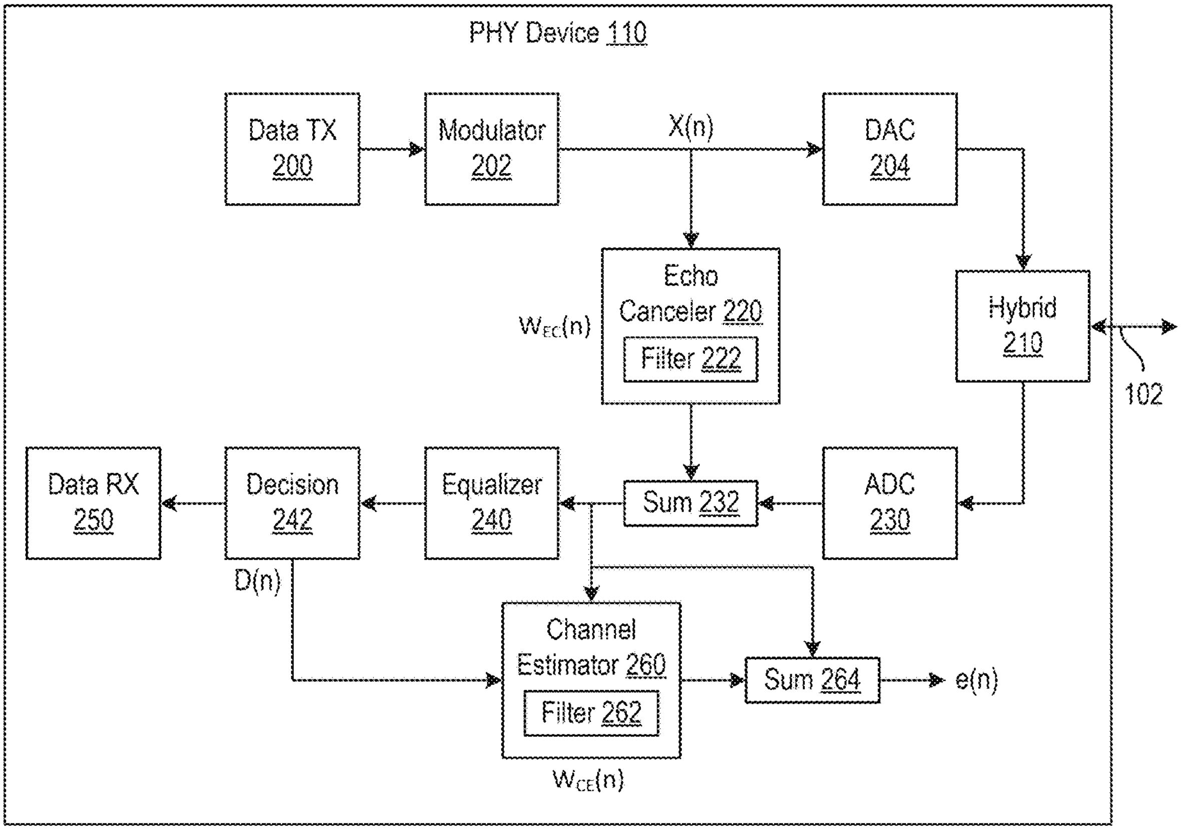
FIG. 2 is a block diagram of a PHY device of the computer system, according to the first embodiment.

FIG. 2 is a block diagram of PHY device 110, according to the first embodiment. According to the first embodiment, adaptive filters of PHY device 110 are used for determining some of the degradation parameters, as discussed further below. PHY device 110 includes various blocks for transmitting, receiving, and processing signals. For example, each of such blocks may be implemented as a circuit or as a combination of circuits.

A data transmission (TX) block 200 prepares digital data to be transmitted by PHY device 110. Such preparation may include, e.g., encoding the data, packetizing the data, and applying error correcting encoding on the data.

A modulator block 202 converts digital data into modulated signals, which includes mapping the digital data to signal characteristics such as amplitude, frequency, and phase.

A digital-to-analog converter (DAC) block 204 converts digital signals into analog signals that are suitable for transmitting over a communication medium such as cable 102.

A hybrid block 210 combines and separates signals transmitted by PHY device 110 over cable 102, referred to herein as "transmitted signals," from signals received by PHY device 110 over cable 102, referred to herein as "received signals." Hybrid block 210 thus enables transmitted and received signals to coexist with reduced interference.

An analog-to-digital converter (ADC) block 230 converts received signals from analog to digital.

An echo canceler block 220 estimates (i.e., predicts or approximates) unwanted echo signals in received signals and cancels (i.e., neutralizes or removes) those echo signals therefrom. Such echo signals are reflected or delayed versions of the transmitted signals. Echo canceler block 220 includes an adaptive filter 222. An adaptive filter is a digital filter including coefficients that are adjusted in response to changes to input signals. Such adjustments are made continuously to minimize differences between outputs of the adaptive filter and desired reference signals. Adaptive filter 222 performs such adjustments based on outputs from modulator block 202 to help remove echo signals.

A summation block 232 adds signals output from echo canceler block 220 and ADC block 230 to combine the signals.

An equalizer block 240 adjusts the received signals to counteract distortions thereof, which are due to effects such as inter-symbol interference. Adjusting the received signals improves the accuracy of interpreting them.

A decision block 242 interprets received signals to determine, as accurately as possible, the intended bits of the received signals, i.e., the bits intended to be communicated by link partner 120.

A data reception (RX) block 250 manages the reception of incoming data from the received signals, including, e.g., organizing such data into frames and performing error correction on the data.

A channel estimator block 260 is an optional block that may estimate conditions of a communication channel such as noise. A communication channel is a logical or conceptual pathway through which data travels, e.g., over cable 102. Noise is a level of random interference added to a signal. Estimating the conditions of the channel allows for more accurately interpreting received signals traveling across the channel. Channel estimator block 260 includes an adaptive filter 262, which includes coefficients that are adjusted based on outputs from decision block 242.

A summation block 264 adds signals output from summation block 232 and channel estimator block 260 to combine the signals.

As PHY device 110 transmits and receives signals, PHY device 110 provides information to processor 130, and processor 130 may determine degradation parameters therefrom. Examples of such degradation parameters include echo cancellation (EC) vectors, channel estimation (CE) vectors, signal-to-noise ratios (SNRs), and rates of encountering forward error correction (FEC) errors. An EC vector is a vector of values used for estimating and canceling echoes from transmitted signals. A CE vector is a vector of values for estimating an impulse response of a communication channel based on received signals. An SNR is a measure that compares a level of a received signal with a level of noise associated therewith.

FEC is a technique used for detecting and correcting errors that occur during the transmission of data. There are various FEC schemes that use varying types of codes for such functionality, including trellis coded modulation, convolutional codes, Hamming codes, Reed-Solomon (RS) codes, low-density parity check (LDPC) codes, turbo codes, etc. PHY device 110 may apply FEC to transmitted signals to ensure that link partner 120 correctly interprets them. Similarly, link partner 120 may apply FEC to received signals to ensure that PHY device 110 correctly interprets them.

FEC errors are errors that occur during the transmission of a signal. An FEC mechanism detects and attempts to correct FEC errors, some FEC errors being correctable by the FEC mechanism and others not being correctable. For example, an FEC decoder (not shown) in data RX block 250 may detect FEC errors in received signals but may be unable to correct those errors due to limitations in an FEC scheme used thereby. On the other hand, the FEC decoder may successfully correct the FEC errors. Regardless of whether the FEC decoder is able to correct the errors, RX block 250 may report the number of FEC errors encountered by the FEC decoder to processor 130.

According to the first embodiment, adaptive filter 222 may determine an EC vector, illustrated as $W_{EC}(n)$ for a time n. Adaptive filter 222 determines $W_{EC}(n)$ based on characteristics X(n) and e(n), which are captured by adaptive filter 222. At the time n, X(n) is a vector of values for a transmitted signal after modulation, while e(n) is an estimator residual error value after removing the estimated echo from a received signal. In particular, adaptive filter 222 may determine an EC vector according to the below equation, wherein u is a least mean squares (LMS) step size.

$$W_{EC}(n+1) = W_{EC}(n) + \mu * e(n) * X(n)$$

According to the first embodiment, adaptive filter 262 may determine a CE vector, illustrated as $W_{CE}(n)$ for a time n. Adaptive filter 262 determines $W_{CE}(n)$ based on characteristics D(n) and e(n), which are captured by adaptive filter 262. D(n) is a vector of values of a received signal recovered from decision block 242 at time n. D(n) has been interpreted by decision block 242 after being adjusted by equalizer block 240 based on a distortion of a received signal. In particular, adaptive filter 262 may determine a CE vector according to the below equation.

$$W_{CE}(n+1) = W_{CE}(n) + \mu * e(n) * D(n)$$

According to the first embodiment, decision block 242 may determine an SNR based on a characteristic of a signal output from equalizer block 240, which has been adjusted based on a distortion. Decision block 242 may determine the SNR by comparing a level of the signal with a level of noise therein. Data RX block 250 may determine a number of FEC errors based on a characteristic of a signal output from decision block 242, which is a received signal after being interpreted by decision block 242. In particular, data RX block 250 may apply FEC decoding to correct any FEC errors in the signal and may report the number of errors encountered to processor 130. Data RX block 250 may repeatedly report numbers of FEC errors encountered over a time interval as PHY device 110 receives signals from link partner 120 and data RX block 250 detects the errors. Processor 130 may calculate an FEC error rate based on the total number of FEC errors encountered over the time interval and the length of the time interval.

Figure 3:
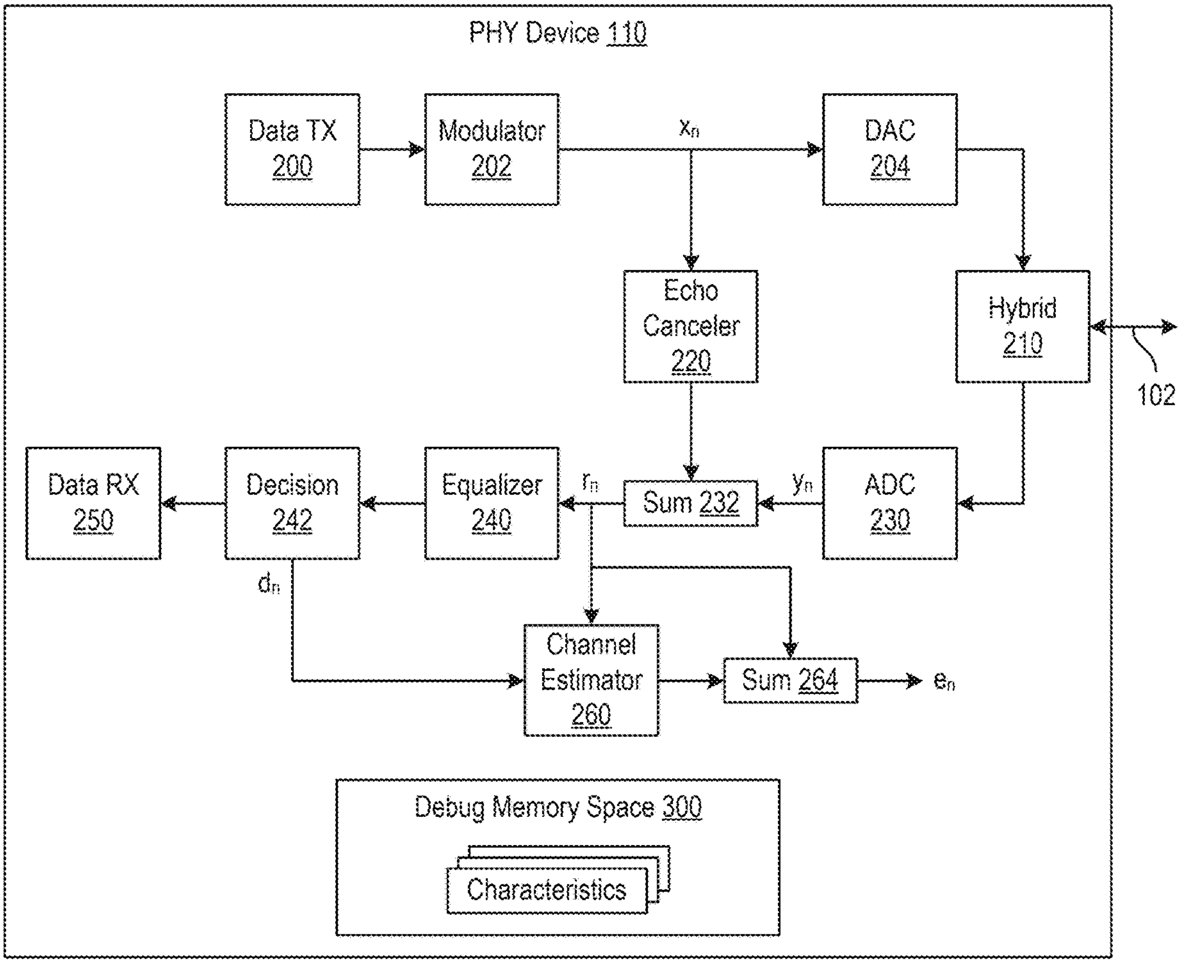
FIG. 3 is a block diagram of the PHY device, according to the second embodiment.

FIG. 3 is a block diagram of PHY device 110, according to the second embodiment. Items that are the same or similar to items of FIG. 2 include the same reference numbers and will not be explained again. According to the second embodiment, PHY device 110 utilizes a debug memory space 300 for determining some of the degradation parameters instead of adaptive filters. In particular, with respect to EC vectors and CE vectors, PHY device 110 stores characteristics in debug memory space 300. PHY device 110 then transmits those characteristics to processor 130 for further processing, as discussed further below. Similar to the first embodiment, decision block 242 may determine an SNR based on a signal output from equalizer block 240, and data RX block 250 may determine numbers of FEC errors based on signals output from decision block 242.

With respect to EC vectors, PHY device 110 may capture characteristics based on a pair of a transmitted signal and a received signal received shortly after transmitting the transmitted signal. PHY device 110 may then store the characteristics in debug memory space 300. Such characteristics at a time n may include $x_n$ and $y_n$. The characteristic $x_n$ is one of the values of the transmitted signal after modulation, and the characteristic $y_n$ is one of the values of the received signal after being converted to digital by ADC block 230. The received signal before an echo therein is canceled by echo canceler block 220 is also referred to herein as a "raw version" of the received signal, $y_n$ being one of the values of the raw version of the received signal.

Later, e.g., when debug memory space 300 becomes full, PHY device 110 may read the characteristics from debug memory space 300 and transmit them to processor 130. Processor 130 may then compute EC vectors according to the below equations at a time n, wherein Zn represents noise, hi represents EC taps, and N represents a capture length of a pair of a transmitted signal and received signal. It should be noted that the received signal may be delayed with respect to the transmitted signal. Accordingly, as an optimization, PHY device 110 may wait a predetermined time period after capturing instances of $x_n$ before capturing instances of $y_n$. This may prevent capturing bits that are not useful for determining an EC vector.

$$y_n = \sum_{l=0}^{L-1} x_{n-l} * h_l + z_n$$

$$\hat{h}_{l'} = \text{Exp}\left\{\frac{1}{n} * \sum_{n=0}^{N-1} y_{n+l'} * x_n\right\} = \sigma_x^2 * h_{l'}$$

The characteristics stored in debug memory space 300 by PHY device 110 may instead include $x_n$ and $e_n$. In such case, processor 130 may instead compute EC vectors according to the below equations at the time n, wherein $h_{r,1}$ represents a residual coefficient not included in the filter of echo canceler block 220. It should be noted that $e_n$ may be delayed with respect to $x_n$. Accordingly, as an optimization, PHY device 110 may wait a predetermined time period after capturing instances of $x_n$ before capturing instances of $e_n$.

$$e_n = \sum_{l=0}^{L-1} x_{n-l} * h_{r,l} + z_n$$

$$\hat{h}_{r,l'} = \text{Exp}\left\{\frac{1}{N} * \sum_{n=0}^{N-1} e_{n+l'} * x_n\right\} = \sigma_x^2 * h_{r,l'}$$

With respect to CE vectors, PHY device 110 may capture characteristics based on a received signal and store the characteristics in debug memory space 300. Such characteristics at a time n may include $r_n$ and $d_n$. The characteristic $r_n$ is one of the values of a received signal after the echo is canceled therefrom, the echo being from a transmitted signal. The characteristic $d_n$ is one of the values of a received signal recovered from decision block 242.

As with EC vectors, PHY device 110 may read the characteristics from debug memory space 300 and transmit them to processor 130. Processor 130 may then compute CE vectors according to the below equations at the time n, wherein $g_1$ represents CE taps. It should be noted that $d_n$ may be delayed with respect to $r_n$. Accordingly, as an optimization, PHY device 110 may wait a predetermined time period after capturing instances of $r_n$ before capturing instances of $d_n$.

$$r_n = \sum_{l=0}^{L-1} d_{n-l} * g_l + z_n$$

$$\hat{g}_{l'} = \text{Exp}\left\{\frac{1}{N} * \sum_{n=0}^{N-1} r_{n+l'} * d_n\right\} = \sigma_d^2 * g_{l'}$$

The characteristics stored in debug memory space 300 by PHY device 110 may instead include $d_n$ and $e_n$. In such case, processor 130 may instead compute CE vectors according to the below equations at the time n, wherein $g_{r,1}$ represents a residual coefficient not included in the filter of channel estimator block 260. It should be noted that $d_n$ may be delayed with respect to $e_n$. Accordingly, as an optimization, PHY device 110 may wait a predetermined time period after capturing instances of $e_n$ before capturing instances of $d_n$.

$$e_n = \sum_{l=0}^{L-1} d_{n-l} * g_{r,l} + z_n$$

$$\hat{g}_{r,l'} = \text{Exp}\left\{\frac{1}{N} * \sum_{n=0}^{N-1} r_{n+l'} * d_n\right\} = \sigma_d^2 * g_{r,l'}$$

Figure 4:
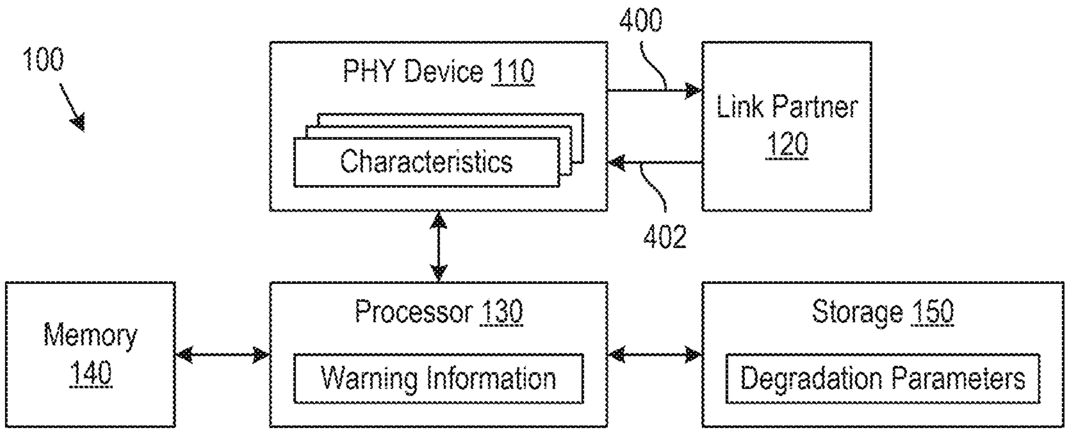
FIG. 4 is a block diagram of the computer system in which a third embodiment may be implemented.

FIG. 4 is a block diagram of computer system 100 in which a third embodiment may be implemented. Items that are the same or similar to items of FIG. 1 include the same reference numbers and will not be explained again. According to the third embodiment, PHY device 110 is configured to communicate with link partner 120 via automotive communication cables 400 and 402. According to the third embodiment, cables 400 and 402 are simplex cables. PHY device 110 transmits signals to link partner 120 via cable 400 and receives signals from link partner 120 via cable 402.

Figure 5:
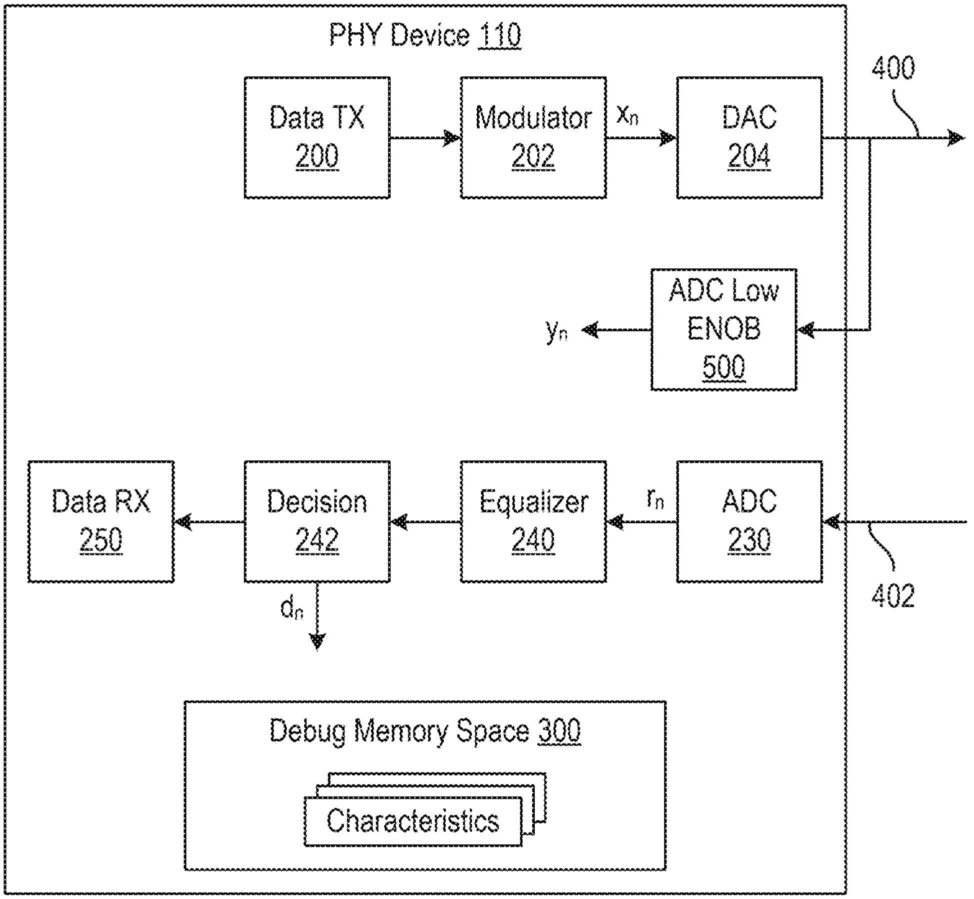
FIG. 5 is a block diagram of the PHY device, according to the third embodiment.

FIG. 5 is a block diagram of PHY device 110, according to the third embodiment. Items that are the same or similar to items of FIG. 3 include the same reference numbers and will not be explained again. According to the third embodiment, PHY device 110 includes an ADC low effective number of bits (ENOB) block 500. ADC low ENOB block 500 is an ADC with a low effective resolution. ADC low ENOB block 500 captures an echo of a transmitted signal that is transmitted via cable 400 and converts the echo to digital.

Similar to the first and second embodiments, decision block 242 may determine an SNR based on a signal output from equalizer block 240, and data RX block 250 may determine numbers of FEC errors based on signals output from decision block 242. With respect to EC vectors, PHY device 110 may capture characteristics based on a transmitted signal and an echo thereof. PHY device 110 may then store the characteristics in debug memory space 300. Such characteristics at a time n may include $x_n$ and $y_n$. The characteristic $x_n$ is one of the values of a transmitted signal, and the characteristic $y_n$ is one of the values of an echo of the transmitted signal after being converted to digital by ADC low ENOB block 500.

Later, e.g., when debug memory space 300 becomes full, PHY device 110 may read the characteristics from debug memory space 300 and transmit them to processor 130. Processor 130 may then compute EC vectors according to the below equations at a time n. It should be noted that $y_n$ may be delayed with respect to $x_n$. Accordingly, as an optimization, PHY device 110 may wait a predetermined time period after capturing instances of $x_n$ before capturing instances of $y_n$.

$$y_n = \sum_{l=0}^{L-1} x_{n-l} * h_l + z_n$$

$$\hat{h}_{l'} = \text{Exp}\left\{\frac{1}{N} * \sum_{n=0}^{N-1} y_{n+l'} * x_n\right\} = \sigma_x^2 * h_{l'}$$

Similar to the second embodiment, with respect to CE vectors, PHY device 110 may capture characteristics based on a received signal and store the characteristics in debug memory space 300. Such characteristics at a time n may include $r_n$ and $d_n$. The characteristic $r_n$ is one of the values of a received signal after being converted to digital by ADC block 230. The characteristic $d_n$ is one of the values of a received signal recovered from decision block 242.

As with EC vectors, PHY device 110 may read the characteristics from debug memory space 300 and transmit them to processor 130. Processor 130 may then compute CE vectors according to the below equations at the time n. It should be noted that $d_n$ may be delayed with respect to $r_n$. Accordingly, as an optimization, PHY device 110 may wait a predetermined time period after capturing instances of $r_n$ before capturing instances of $d_n$.

$$r_n = \sum_{l=0}^{L-1} d_{n-l} * g_l + z_n$$

$$\hat{g}_{l'} = \text{Exp}\left\{\frac{1}{N} * \sum_{n=0}^{N-1} r_{n+l'} * d_n\right\} = \sigma_d^2 * g_{l'}$$

Figure 6:
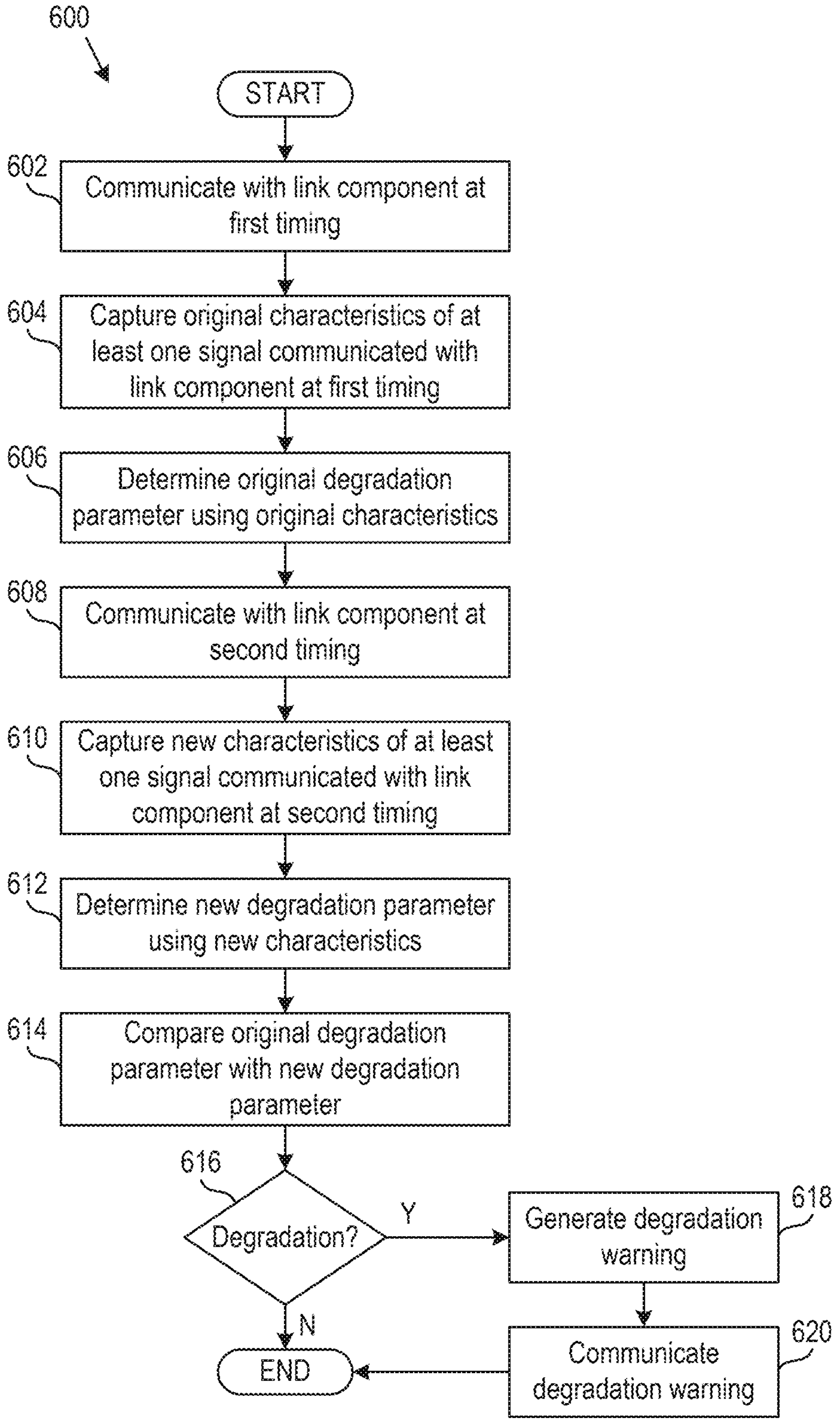
FIG. 6 is a flow diagram of a method that may be performed by the computer system to detect degradation in an automotive communication cable, according to some embodiments.

FIG. 6 is a flow diagram of a method 600 that may be performed by computer system 100 to detect degradation in an automotive communication cable, according to some embodiments. With respect to method 600, the cable being analyzed may be cable 102 of the first and second embodiments or either of cables 400 and 402 of the third embodiment. At step 602, PHY device 110 communicates with link partner 120 at a first timing. For example, the first timing may be shortly after manufacturing of the vehicle. The communication may include transmitting and receiving signals via cable 102. Alternatively, the communication may include transmitting a signal via cable 400 and receiving a signal via cable 402.

At step 604, PHY device 110 captures characteristics of at least one signal communicated with link partner 120 at the first timing. The characteristics captured at the first timing are referred to herein as “original characteristics.” As discussed above, some characteristics are based on only a transmitted signal or only a received signal, while other characteristics are based on both the transmitted and received signals. At step 606, computer system 100 determines a degradation parameter using the original characteristics. Such degradation parameter is referred to herein as an “original degradation parameter.” Processor 130 may persist the original degradation parameter in storage 150.

For example, as discussed above, if the original degradation parameter is an SNR, PHY device 110 may determine the original degradation parameter such as by computing the SNR. PHY device 110 may then transmit the original degradation parameter to processor 130. Processor 130 may then store the transmitted SNR in storage 150. As another example, as discussed above, if the original degradation parameter is an EC or CE vector, PHY device 110 may transmit the original characteristics to processor 130. Processor 130 may then compute the EC or CE vector based on the original characteristics and store them in storage 150.

At step 608, PHY device 110 communicates with link partner 120 at a second timing after the first timing. For example, the second timing may be the next time an operator of the vehicle starts the vehicle or at the end of a monitoring period while the vehicle is operational. As with the first timing, the communication may include transmitting and receiving signals via cable 102 or may alternatively include transmitting a signal via cable 400 and receiving a signal via cable 402. At step 610, PHY device 110 captures characteristics of at least one signal communicated with link partner 120 at the second timing. The characteristics captured at the second timing are referred to herein as “new characteristics.”

At step 612, computer system 100 determines a degradation parameter using the new characteristics. Such degradation parameter is referred to herein as a “new degradation parameter.” As with the original degradation parameter, the new degradation parameter may be determined by PHY device 110 and communicated to processor 130, or may be determined by processor 130. At step 614, computer system 100 compares the original degradation parameter with the new degradation parameter to determine if a difference therebetween indicates degradation, e.g., in cable 102 or in one of cables 400 and 402. Processor 130 may read the original degradation parameter from storage 150 for the comparison.

For example, if the original and new degradation parameters are EC vectors or CE vectors, processor 130 may compare magnitudes of the original and new degradation parameters. If the difference is greater than a threshold, the difference may indicate that there is degradation. Otherwise, the difference may indicate that there is either no degradation or not a significant amount of degradation. As another example, if the original and new degradation parameters are SNRs, processor 130 may compare the values of the SNRs. If the difference is greater than a threshold, the difference may indicate degradation. Otherwise, the difference may indicate no degradation or no significant degradation.

At step 616, if the difference indicates that there is degradation, method 600 moves to step 618. At step 618, processor 130 generates a degradation warning indicating degradation in cable 102 or in one of cables 400 and 402. At step 620, processor 130 communicates the degradation warning information, e.g., to a driver of the vehicle or to a technician that services the vehicle. For example, if processor 130 is a CPU of an ECU of the vehicle, processor 130 may update a monitor of the vehicle to display the warning. As another example, if processor 130 is a CPU of a separate computer, processor 130 may update a display of the computer or a monitor connected to the computer to display the warning.

After step 620, method 600 ends. Returning to step 616, if the difference between the original and new degradation parameters indicates that there is no degradation or no significant degradation, method 600 ends. As mentioned above, the original and new degradation parameters may be rates of encountering FEC errors. Accordingly, the communication with link component 120 at step 602 may include the reception of several signals from link component 120 over a time interval, i.e., the first timing may be a first time interval. Similarly, the communication with link component 120 at step 608 may include the reception of several signals over a second time interval. During such time intervals, PHY device 110 may transmit several numbers of FEC errors encountered to processor 130.

Processor 130 may compute the original degradation parameter as the rate of encountering FEC errors over the first time interval and the new degradation parameter as the rate of encountering FEC errors over the second time interval. According to such example, at step 614, processor 130 may determine whether the rate of the new degradation parameter is greater than the rate of the original degradation parameter or may determine whether the rate of the new degradation parameter is greater by a threshold amount. If so, such determination may indicate degradation. Otherwise, the determination may indicate no degradation or no significant degradation.

It should be noted that method 600 may be performed without disrupting normal operations of the vehicle. Indeed, method 600 may be performed in the background while the vehicle is being operated and PHY device 110 is communicating with link partner 120 to support typical operations of the vehicle. It should also be noted that a degradation parameter may be determined periodically, e.g., every time the operator starts the vehicle or at the ends of monitoring periods while the vehicle is operational. Each time the degradation parameter is determined, it may be compared, e.g., to a baseline. For example, steps 608-616 may be repeated periodically and compared with an original degradation parameter, and then steps 618-620 may be performed if the difference indicates degradation.

It should also be noted that although method 600 has been discussed with respect to a single original degradation parameter and a single new degradation parameter, embodiments are not limited thereby. For example, at step 606, computer system 100 may determine multiple original degradation parameters using the original characteristics, such as a CE vector and an EC vector. Later, at step 612, computer system 100 may determine multiple new degradation parameters using the new characteristics, such as another CE vector and EC vector. Then, at step 614, computer system 100 may compare the original degradation parameters with corresponding new degradation parameters. For example, if any of such comparisons indicates degradation, computer system 100 may performs steps 618 and 620.

It should also be noted that although method 600 has been discussed with respect to determining a single original degradation parameter and a single new degradation parameter, multiple of the same type of each may be determined. For example, around the first timing, PHY device 110 may capture original characteristics for multiple pairs of transmitted and received signals. Computer system 100 may then determine degradation parameters based on such original characteristics and combine them, e.g., by averaging them, to determine a combined original degradation parameter. Around the second timing, PHY device 110 may then capture new characteristics for multiple pairs of transmitted and received signals. Computer system 100 may then determine degradation parameters based on such new characteristics and combine them, e.g., by averaging them, to determine a combined new degradation parameter. Then, at step 614, computer system 100 may compare the combined original degradation parameter with the combined new degradation parameter. If the difference indicates degradation, computer system 100 may performs steps 618 and 620.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

The embodiments described herein also relate to an apparatus for performing these operations. The apparatus may be specially constructed for required purposes, or the apparatus may be a general-purpose computer selectively activated or configured by a computer program stored in the computer. The embodiments described herein may also be practiced with computer system configurations including mobile computing devices, personal computers, server computers, microprocessor systems, mainframe computers, etc., and combinations thereof, which may communicate across one or more networks.

The embodiments described herein also relate to one or more computer programs or as one or more computer program modules embodied in computer-readable storage media. The term computer-readable medium refers to any data storage device that can store data, which can thereafter be input into an apparatus or computer system. Computer-readable media may be based on any existing or subsequently developed technology that embodies computer programs in a manner that enables a computer to read the programs. Examples of computer-readable media include magnetic drives, solid-state drives (SSDs), network-attached storage (NAS) systems, RAM, read-only memory (ROM), compact disks (CDs), digital versatile disks (DVDs), and other optical and non-optical data storage devices. A computer-readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components may be implemented as a combined component. Similarly, structures and functionalities presented as a single component may be implemented as separate components. These and other variations, additions, and improvements may fall within the scope of the appended claims.

What is claimed is:

1. A computer system of a vehicle, comprising a processor and a physical layer (PHY) device that is configured to communicate with other components of the vehicle via at least a first cable, wherein the computer system is configured to perform the following steps to detect degradation in the first cable:

- communicating with another component of the vehicle using the PHY device and the first cable at a first timing;
- capturing first characteristics of at least one first signal communicated with the other component at the first timing, and determining a first degradation parameter using the first characteristics;
- communicating with the other component of the vehicle using the PHY device and the first cable at a second timing that is after the first timing;
- capturing second characteristics of at least one second signal communicated with the other component at the second timing, and determining a second degradation parameter using the second characteristics; and
- comparing the first degradation parameter with the second degradation parameter, and generating a degradation warning if a difference between the first and second degradation parameters indicates degradation in the first cable.

2. The computer system of claim 1, wherein the first cable is a duplex cable, communicating with the other component of the vehicle at the first timing includes transmitting a first transmitted signal and receiving a first received signal via the first cable, and communicating with the other component of the vehicle at the second timing includes transmitting a second transmitted signal and receiving a second received signal via the first cable.

3. The computer system of claim 1, wherein the first cable is a simplex cable, communicating with the other component of the vehicle at the first timing includes transmitting a first transmitted signal via the first cable and receiving a first received signal via a second cable separate from the first cable, and communicating with the other component of the vehicle at the second timing includes transmitting a second transmitted signal via the first cable and receiving a second received signal via the second cable.

4. The computer system of claim 1, wherein the first cable is a simplex cable, communicating with the other component of the vehicle at the first timing includes transmitting a first transmitted signal via a second cable separate from the first cable and receiving a first received signal via the first cable, and communicating with the other component of the vehicle at the second timing includes transmitting a second transmitted signal via the second cable and receiving a second received signal via the first cable.

5. The computer system of claim 1, wherein an adaptive filter of the PHY device captures the first and second characteristics and determines the first and second degradation parameters.

6. The computer system of claim 1, wherein the steps further include:

storing the first characteristics in a debug memory space of the PHY device and reading the first characteristics from the debug memory space for determining the first degradation parameter; and storing the second characteristics in the debug memory space and reading the second characteristics from the debug memory space for determining the second degradation parameter.

7. The computer system of claim 1, wherein the steps further include:

waiting, by the PHY device, a predetermined time period after capturing one of the first characteristics before capturing another one of the first characteristics; and waiting, by the PHY device, the predetermined time period after capturing one of the second characteristics before capturing another one of the second characteristics.

8. The computer system of claim 1, wherein capturing the first characteristics includes capturing a value of a raw version of a first received signal received by the PHY device via the first cable, and capturing the second characteristics includes capturing a value of a raw version of a second received signal received by the PHY device via the first cable.

9. The computer system of claim 1, wherein capturing the first characteristics includes capturing a value of a first version of a first received signal received by the PHY device via the first cable, a first echo being canceled in the first version of the first received signal, and capturing the first characteristics further includes capturing a value of a second version of the first received signal that has been interpreted after being adjusted based on a distortion of the first received signal, and capturing the second characteristics includes capturing a value of a first version of a second received signal received by the PHY device via the first cable, a second echo being canceled in the first version of the second received signal, and capturing the second characteristics further includes capturing a value of a second version of the second received signal that has been interpreted after being adjusted based on a distortion of the second received signal.

10. The computer system of claim 1, wherein capturing the first characteristics includes capturing a value for estimating a channel for a first received signal received by the PHY device via the first cable, and capturing the second characteristics includes capturing a value for estimating the channel for a second received signal received by the PHY device via the first cable.

11. The computer system of claim 1, wherein comparing the first and second degradation parameters includes one of: (1) comparing an echo cancellation (EC) vector for estimating and canceling a first echo from a first transmitted signal transmitted by the PHY device via the first cable, with an EC vector for estimating and canceling a second echo from a second transmitted signal transmitted by the PHY device via the first cable, (2) comparing a channel estimation (CE) vector for estimating a first impulse response of a communication channel based on a first received signal received by the PHY device via the first cable, with a CE vector for estimating a second impulse response of the communication channel based on a second received signal received by the PHY device via the first cable, (3) comparing a first signal-to-noise ratio (SNR) associated with the first received signal, with a second SNR associated with the second received signal, and (4) determining that a rate of encountering forward error correction (FEC) errors over a second time interval is greater than a rate of encountering FEC errors over a first time interval.

12. A method of detecting degradation in a first cable over which a physical layer (PHY) device of a computer system of a vehicle is configured to communicate with other components of the vehicle, the method comprising:

communicating with another component of the vehicle using the PHY device and the first cable at a first timing;

capturing first characteristics of at least one first signal communicated with the other component at the first timing, and determining a first degradation parameter using the first characteristics;

communicating with the other component of the vehicle using the PHY device and the first cable at a second timing that is after the first timing;

capturing second characteristics of at least one second signal communicated with the other component at the second timing, and determining a second degradation parameter using the second characteristics; and comparing the first degradation parameter with the second degradation parameter, and generating a degradation warning if a difference between the first and second degradation parameters indicates degradation in the first cable.

13. The method of claim 12, wherein the first cable is a duplex cable, communicating with the other component of the vehicle at the first timing includes transmitting a first transmitted signal and receiving a first received signal via the first cable, and communicating with the other component of the vehicle at the second timing includes transmitting a second transmitted signal and receiving a second received signal via the first cable.

14. The method of claim 12, wherein the first cable is a simplex cable, communicating with the other component of the vehicle at the first timing includes transmitting a first transmitted signal via the first cable and receiving a first received signal via a second cable separate from the first cable, and communicating with the other component of the vehicle at the second timing includes transmitting a second transmitted signal via the first cable and receiving a second received signal via the second cable.

15. The method of claim 12, wherein the first cable is a simplex cable, communicating with the other component of the vehicle at the first timing includes transmitting a first transmitted signal via a second cable separate from the first cable and receiving a first received signal via the first cable, and communicating with the other component of the vehicle at the second timing includes transmitting a second transmitted signal via the second cable and receiving a second received signal via the first cable.

16. The method of claim 12, further comprising:

storing the first characteristics in a debug memory space of the PHY device and reading the first characteristics from the debug memory space for determining the first degradation parameter; and storing the second characteristics in the debug memory space and reading the second characteristics from the debug memory space for determining the second degradation parameter.

17. The method of claim 12, further comprising:

waiting, by the PHY device, a predetermined time period after capturing one of the first characteristics before capturing another one of the first characteristics; and waiting, by the PHY device, the predetermined time period after capturing one of the second characteristics before capturing another one of the second characteristics.

18. The method of claim 12, wherein capturing the first characteristics includes capturing a value of a raw version of a first received signal received by the PHY device via the first cable, and capturing the second characteristics includes capturing a value of a raw version of a second received signal received by the PHY device via the first cable.

19. A non-transitory, computer-readable medium comprising instructions that are executable in a computer system of a vehicle, wherein the instructions when executed cause the computer system to carry out a method of detecting degradation in a first cable over which a physical layer (PHY) device of the computer system is configured to communicate with other components of the vehicle, and wherein the method comprises:

identifying first characteristics of at least one first signal communicated between the PHY device and another component of the vehicle at a first timing using the first cable, and determining a first degradation parameter using the first characteristics;

identifying second characteristics of at least one second signal communicated between the PHY device and the other component at a second timing that is after the first timing, using the first cable, and determining a second degradation parameter using the second characteristics; and comparing the first degradation parameter with the second degradation parameter, and generating a degradation warning if a difference between the first and second degradation parameters indicates degradation in the first cable.

20. The non-transitory, computer-readable medium of claim 19, wherein comparing the first and second degradation parameters includes one of: (1) comparing an echo cancellation (EC) vector for estimating and canceling a first echo from a first transmitted signal transmitted by the PHY device via the first cable, with an EC vector for estimating and canceling a second echo from a second transmitted signal transmitted by the PHY device via the first cable, (2) comparing a channel estimation (CE) vector for estimating a first impulse response of a communication channel based on a first received signal received by the PHY device via the first cable, with a CE vector for estimating a second impulse response of the communication channel based on a second received signal received by the PHY device via the first cable, (3) comparing a first signal-to-noise ratio (SNR) associated with the first received signal, with a second SNR associated with the second received signal, and (4) determining that a rate of encountering forward error correction (FEC) errors over a second time interval is greater than a rate of encountering FEC errors over a first time interval.

* * * * *